United States Patent Office 3,157,250
Patented Nov. 17, 1964

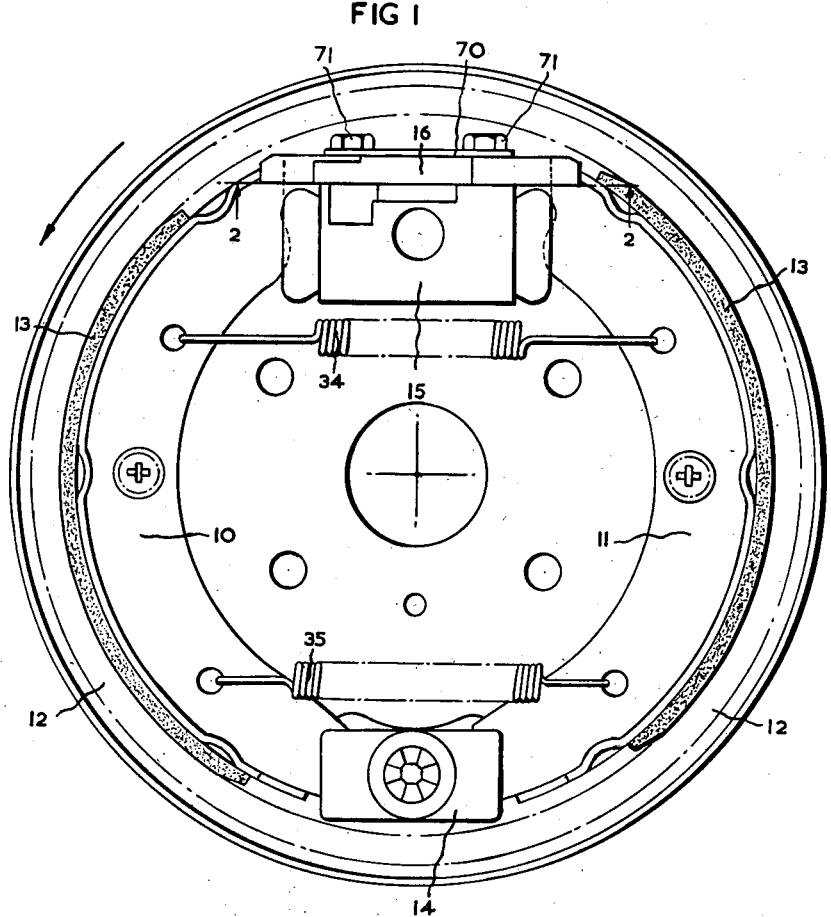

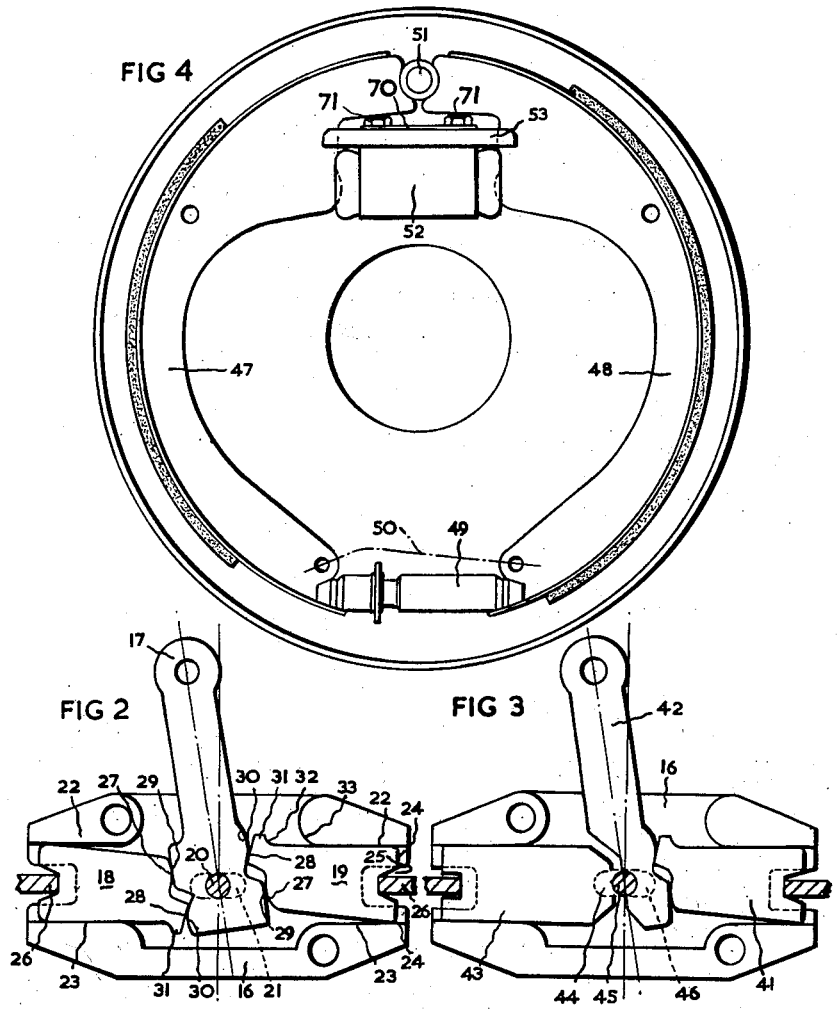

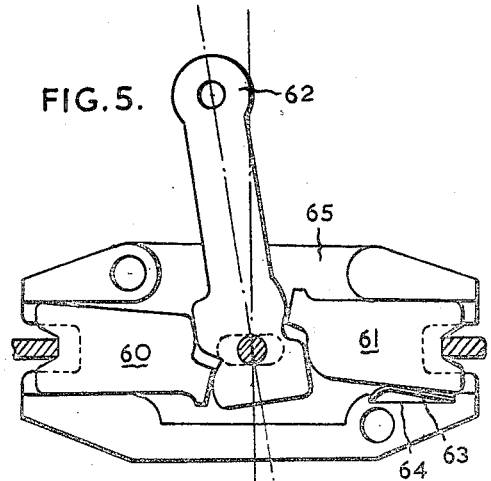
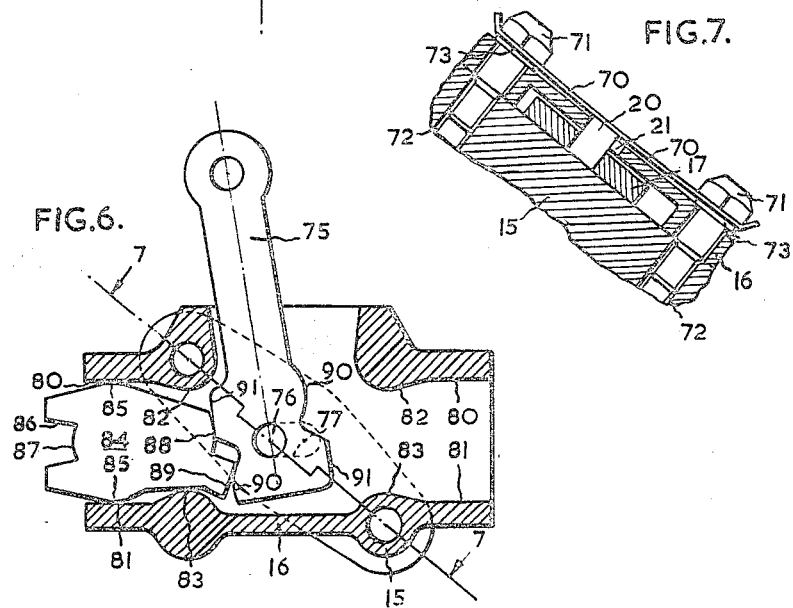

3,157,250
SHOE ACTUATING MEANS FOR SHOE
DRUM BRAKES
Frederick Thomas Riddy, Erdington, Birmingham, England, assignor to Girling Limited, Birmingham, England, a British company
Filed June 25, 1963, Ser. No. 290,466
11 Claims. (Cl. 188—78)

This invention relates to improvements in mechanical actuating means for the shoes of a brake of the kind in which two arcuate shoes mounted on a stationary back-plate and co-operating with a rotatable drum are adapted to be separated by an actuator located between adjacent ends of the shoes, the other ends of the shoes being adapted to pivot or to rock and slide on a stationary anchorage or anchorages or being articulated together in the case of a brake of the duo-servo type; and the present application is a continuation-in-part of application Serial Number 180,745, filed March 19, 1962, and now abandoned.

According to my invention, an actuator for the shoes of a shoe drum brake comprises a stationary housing located between the shoe ends, an angularly movable cam lever which pivots about a pin guided to slide in the housing in the direction of movement of the shoe ends, and at least one tappet slidably mounted in the housing and interposed between the cam lever and one of the shoes.

The other shoe may be actuated by a second tappet opposed to the first, or it may engage with the pin on which the cam lever pivots so that it is actuated by the reaction of the cam lever and pin. The tappet or tappets may have a pure sliding movement between parallel guiding surfaces in the housing, but preferably they are permitted a limited degree of rocking movement in the plane of the shoes.

The cam lever and the tappet or tappets are bodily movable as a unit so that in the off position of the brake they take up a centralised position under the influence of the usual pull-off springs.

The co-operating surface or surfaces on the cam lever and the inner ends of the tappet or tappets are of such a form as to provide a purely rolling engagement, and the form of the tappets is preferably such as to allow the tappets to rock between their guides without risk of locking or jamming in the guides.

The cam lever pivots on the pin which slides in a slot in the housing parallel to the guiding surfaces for the tappets, and the pin which is floating is preferably located axially by a leaf spring engaging the end of the pin which projects a short distance through the housing.

Some practical forms of brake actuator in accordance with my invention are illustrated by way of example in the accompanying drawings in which:

FIGURE 1 is an end elevation of a brake in which the shoes pivot on a stationary anchorage and are separated by a mechanical actuator in accordance with my invention;

FIGURE 2 is a section on the line 2—2 of FIGURE 1 showing the operative parts of the actuator;

FIGURE 3 is a section similar to FIGURE 2 but showing a modified form of actuator;

FIGURE 4 is an end elevation similar to FIGURE 1 but showing a brake of the duo-servo type;

FIGURE 5 is a similar section to FIGURE 2 but showing a further modified form of actuator;

FIGURE 6 is a similar section to FIGURE 2 but showing yet a further modified form of actuator; and FIGURE 7 is a section on line 7—7 of FIGURE 6 showing an arrangement of a leaf spring for retaining the end of the pivot pin embodied in the actuators illustrated in FIGURES 2, 3, 5 and 6.

In the brake shown in FIGURE 1, two opposed arcuate shoes 10, 11 are mounted on a stationary back-plate 12, the shoes carrying friction linings 13 adapted to engage with a rotatable drum (not shown). The shoes at one end fulcrum on a stationary adjuster 14 mounted on the back-plate. At their other ends the shoes are adapated to be separated by a double-ended hydraulic cylinder 15 mounted on the back-plate, the cylinder 15 being connected to a pedal operated master cylinder for the normal application of the brake.

The shoes are also separable by a mechanical actuator mounted in a housing 16 which may be integral with or rigidly secured to the outer side of the hydraulic cylinder 15.

The operative parts of the mechanical actuator as shown in FIGURE 2 comprise a cam lever 17 and two opposed tappets 18, 19. The cam lever pivots on a pin 20 which is slidable in a slot 21 in the housing substantially in alignment with the axis of the tappets. The outer end of the lever is adapted to be connected by a pull-rod or cable to a hand-lever.

As shown in FIGURE 7, the pin 20 projects through the housing by a short distance, the end of the pin engaging with a leaf spring 70 retained at each end by bolts 71 which are screw-threaded into tapped holes 72 in the body of the hydraulic cylinder 15 for securing the housing to the cylinder. A washer or spacer 73 carried by each bolt is provided between each end of the leaf spring and the housing to allow the spring to deflect in both directions.

The tappets are guided to slide between spaced parallel guiding surfaces 22, 23 at opposite ends of the housing. Each tappet is tapered in width, the maximum width being adjacent to the outer end and being such that the tappet can slide freely between the guiding surfaces. On the outer side of the part of maximum width the edges of the tappet are chamfered or rounded off as shown at 24, and a notch 25 is formed in the outer end of the tappet to receive the web 26 of a shoe.

The inner end of the tappet is stepped to provide a curved surface 27 of substantial radius and an inwardly staggered straight or substantially straight surface 28 which is inclined at a small angle to a line at right angles to the direction of movement of the tappets, these surfaces being on opposite sides of the centre line of the tappet in the two tappets.

The cam lever has on each side stepped surfaces complementary to those on the inner ends of the tappets, that is, a substantially straight surface 29 for engagement with the curved surface 27 of a tappet and a curved surface 30 for engagement with the straight surface 28 of the tappet.

The form of these surfaces is such that when the lever is moved angularly to urge the tappets apart the surfaces on the lever roll on those on the tappets.

Aa laterally projecting lug or heel 31 is provided on the inner end of each tappet on the side towards which the tappet rocks when the brake is applied and this lug or heel has a radiused edge 32 adapted to engage with a radiused corner 33 on the inner end of the adjacent guide for the tappet when the tappets are fully extended.

FIGURE 2 shows the cam lever and tappets in their normal off position, the tappets being held in engagement with the cam lever by the usual pull-off springs 34, 35 connected between the shoes as shown in FIGURE 1.

The brake is applied by angular movement of the cam lever in a clockwise direction as seen in FIGURE 2. The tappets are thereby urged in opposite directions to separate the shoes, the curved surfaces 30 on the cam lever rolling on the straight surfaces 28 on the inner ends of the tappets. The greater part of the force applied by the cam lever to the tappets acts in a direction to urge the tappets apart but there is a relatively small transverse component of the force. In the off position of the mechanism as shown in FIGURE 2 the right hand tappet 19 is in engagement throughout its length with the guide surface 22 in the housing and the left hand tappet 18 is in engagement with the guide surface 23. As the cam lever moves angularly the tappets are free to rock about their parts of maximum width, their inner ends moving transversely in opposite directions under the transverse component of the force applied to the tappets by the cam lever. This rocking movement of the tappets in conjunction with the angular movement of the cam lever causes the points of engagement between the surfaces 30 on the cam lever and the surfaces 28 on the tappets to move towards the axis of the tappets and as the tappets are then only in sliding engagement with the guide surfaces at their points of maximum width, there is a minimum frictional resistance to the movement of the tappets.

To compensate for unequal wear of the friction linings, the pin can slide in the slot 21 in the drawing so that when the brake is applied the cam lever and tappets can slide as a unit in the housing and the two shoes are applied with equal force.

When the brake is released the brake shoes are retracted by an equal amount under the influence of the pull off springs 34 and 35, the pin however remaining in its new adjusted position within the slot due to the end of the pin engaging with the leaf spring 70. The curved surfaces 27 on the tappets co-operate with the straight surfaces 29 on the cam lever, and when the cam lever is in the normal off position, the co-operation of these surfaces provides a stop preventing further anti-clockwise movement of the cam lever.

In the modified form of actuator shown in FIGURE 3, one tappet 41 is actuated by a cam lever 42, in the manner described above. The other tappet 43 has parallel sides slidably engaging spaced parallel guiding surfaces in the housing 16 and at its inner end has an abutment 44 engaging directly with a pin 45 on which the cam lever pivots and which is slidable in a slot 46 in the housing, the end of the pin projecting through the housing 16 and engaging the leaf spring 70 as described above. When the cam lever is moved angularly in a clockwise direction, the tappet 41 is actuated in the same manner as the tappet 19 in FIGURE 2 while the tappet 43 is moved to the left by the reaction of the cam lever on the pin 45.

In a further modified form of actuator shown in FIGURE 5, each tappet 60 and 61 is actuated by a cam lever 62 in the manner described above. A leaf spring 63 is located within a longitudinal recess 64 in housing 65, the spring being positioned such that the tappet 61 can rock against the resistance of the spring 63 under the transverse component of force applied to the tappet 61 by the lever 62 in separation of the tappets to apply the brakes.

In yet a further modified form of mechanical actuator shown in FIGURE 6, a cam lever 75 pivots on a pin 76 which is slidable in a slot 77 in the housing 16, substantially in alignment with the axis of a pair of opposed tappets, only one of which 84 is shown. The end of the pin projects through the housing and engages against the leaf spring 70.

Spaced guiding surfaces 80 and 81 at opposite ends of the housing 16 are parallel for a substantial length but terminate at their inner ends in curved abutments 82 and 83 projecting towards each other from the corresponding guiding surface. The tappet is slidably mounted between the guiding surfaces 80 and 81, and is tapered towards each end from a curved portion 85 of maximum width spaced between the ends and a notch 86 is formed in the outer end having a curved surface 87 against which the web of the shoe bears.

The inner end of the tappet is stepped to provide a curved surface 88 of substantial radius and an inwardly staggered curved surface 89.

The cam lever 75 has on each side stepped surfaces which co-operate with those on the inner ends of the tappets, that is a curved portion 90 for engagement with the curved surface 89 of a tappet and a straight or substantially straight surface 91 parallel to the longitudinal axis of the cam lever for engagement with the curved surface 88 of a tappet.

The form of these surfaces is such that when the cam lever is moved angularly to urge the tappets apart, the surfaces on the lever roll on those of the tappets and the tappets rock about the curved portions 85, the rocking being limited by the engagement of the tapered portion of the inner ends of the tappets with the curved abutments 83 on the guiding surfaces 80 and 81.

An actuator in accordance with my invention can be employed equally well in a brake of the duo-servo type as shown in FIGURE 4. In this brake two arcuate shoes 47 and 48 are connected at their ends remote from the actuator by a floating force-transmitting member 49 of adjustable length with which the ends of the shoes are held in engagement by a tension spring indicated at 50. The other ends of the shoes engage with a stationary anchorage pin 51 mounted on the back-plate of the brake. The shoes are adapted to be separated at this end by a double-ended hydraulic cylinder 52 and by a mechanical actuator 53 in accordance with my invention, both actuators being located radially inwards from the anchorage pin.

When the brake is applied the shoes tend to rotate with the drum and one or other shoe anchors on the pin 51, depending on the direction of rotation of the drum, while the other shoe applies a thrust to the first shoe through the member 49.

I claim:

1. An actuator for the shoes of a drum brake comprising a stationary housing located between adjacent shoe ends, an angularly movable cam lever pivoting about a pin guided to slide in the housing substantially in the direction of the shoe ends, one end of the pin projecting through the housing and frictionally restrained by means carried by the housing, and at least one tappet slidably mounted in the housing and interposed between the cam lever and one of the shoes, portions carried by the inner ends of the tappet adapted to engage co-operating surfaces carried by the cam lever, whereby the inner end of the tappet is permitted to move transversely between the guide surfaces as the tappet is moved axially by the cam lever.

2. An actuator for the shoes of a drum brake as claimed in claim 1, wherein the means carried by the housing comprise a leaf spring mounted on the exterior of the housing which is engaged by the end of the pin projecting through the housing.

3. An actuator for the shoes of a drum brake as claimed in claim 1, wherein the tappet or each tappet is tapered towards each end from a curved portion of maximum width spaced between the ends of the tappet and the inner end of the tappet or of each tappet is provided with two stepped curved surfaces adapted to co-operate with stepped straight and curved surfaces carried by the cam lever to provide rolling engagement between the cam lever and the tappet, the tappet rocking with the guide surfaces about its curved portion of maximum width.

4. An actuator for the shoes of a drum brake as claimed in claim 1, wherein the tappet is tapered or each tappet is tapered from its greatest width adjacent to its outer end to its narrowest width adjacent its inner end and the inner end of the tappet or of each tappet has curved and straight surfaces located on opposite sides of the longitudinal centre line of the tappet and adapted to cooperate with complementary straight and curved surfaces on the cam lever to provide rolling engagement between the cam lever and the tappet, the tappet rocking within the guide surfaces.

5. An actuator as claimed in claim 4, where there are two opposed tappets of which one is actuated by angular movement of the cam lever and the other is provided with an abutment at its inner end which engages directly with the pin about which the cam lever is adapted to pivot, and actuated by movement of the pin within its guide provided in the housing by the reaction of the cam lever on the pin.

6. An actuator for the shoes of a drum brake comprising two arcuate brake shoes carrying friction linings, a stationary housing located between adjacent shoe ends, an angularly movable cam lever pivoting about a pin guided to slide in the housing substantially in the direction of the shoe ends, one end of the pin projecting through the housing and engaged by a leaf spring mounted on the exterior of the housing, at least one tappet slidably mounted in the housing and interposed between the cam lever and one of the shoes, and tension spring means connecting the brake shoes and operative to hold portions carried by the inner ends of the tappets in engagement with co-operating surfaces carried by the cam lever; the pin, cam lever and the tappets sliding in the housing as a unit towards one shoe end to compensate for wear in its associated friction lining such that both shoes are applied with an equal force and the tension spring means are effective to retract each brake shoe by an equal amount when the brake is released, the pin remaining in its new adjusted position by the engagement of its end with the leaf spring.

7. An actuator for the shoes of a drum brake comprising a stationary housing located between adjacent shoe ends, and angularly movable cam lever pivoting about a pin guided to slide in the housing substantially in the direction of the shoe ends, and at least one tappet slidably mounted in the housing and interposed between the cam lever and one of the shoes, wherein the tappet or each tappet is slidably guided between parallel guide surfaces in the housing and the tappet is tapered from its greatest width adjacent to its outer end to its narrowest width adjacent to its inner end, portions carried by the inner end of the tappet adapted to engage complementary surfaces carried by the cam lever, whereby the inner end of the tappet is permitted to move transversely between the guide surfaces as the tappet is moved axially by the cam lever.

8. An actuator as claimed in claim 7, wherein there are two opposed tappets of which one is actuated by angular movement of the cam lever and the other is provided with an abutment at its inner end which engages directly with the pin about which the cam lever is adapted to pivot, and actuated by movement of the pin within its guide provided in the housing by the reaction of the cam lever on the pin.

9. An actuator for the shoes of a drum brake comprising a stationary housing located between adjacent shoe ends, an angularly movable cam lever pivoting about a pin guided to slide in the housing substantially in the direction of the shoe ends, and at least one tappet slidably mounted in the housing and interposed between the cam lever and one of the shoes, wherein the tappet or each tappet is slidably guided between parallel guide surfaces in the housing and the tappet is tapered from its greatest width adjacent to its outer end to its narrowest width adjacent to its inner end, and the inner end of the tappet or of each tappet has curved and straight surfaces located on opposite sides of the longitudinal centre line of the tappet and adapted to co-operate with complementary straight and curved surfaces on the cam lever to provide rolling engagement between the cam lever and the tappet, whereby the inner end of the tappet is permitted to move transversely between the guide surfaces as the tappet is moved axially by the cam lever.

10. An actuator for the shoes of a drum brake comprising a stationary housing located between adjacent shoe ends, an angularly movable cam lever pivoting about a pin guided to slide in the housing substantially in the direction of the shoe ends, and at least one tappet slidably mounted in the housing and interposed between the cam lever and one of the shoes, wherein the tappet or each tappet is slidably guided between guide surfaces in the housing and the tappet is tapered from its greatest width adjacent to its outer end to its narrowest width adjacent to its inner end, portions carried by the inner end of the tappet adapted to engage complementary surfaces carried by the cam lever, whereby the inner end of the tappet is permitted to move transversely between the guide surfaces as the tappet is moved axially by the cam lever, and including a spring located between the tappet and the guide surface in the housing towards which the tappet moves transversely when it is moved axially by the cam lever.

11. A drum brake comprising a stationary back plate, two arcuate shoes mounted on the back plate and co-operating with a rotatable drum, an actuator comprising a stationary housing located between adjacent ends of the shoes, an angularly movable cam lever pivoting about a pin guided to slide in the housing substantially in the direction of the shoe ends, one end of the pin projecting through the housing and frictionally restrained by means carried by the housing, and at least one tappet slidably mounted in the housing and interposed between the cam lever and one of the shoes, portions carried by the inner ends of the tappet adapted to engage co-operating surfaces carried by the cam lever, whereby the inner end of the tappet is permitted to move transversely between the guide surfaces as the tappet is moved axially by the cam lever.

References Cited in the file of this patent
UNITED STATES PATENTS

| | | |
|---|---|---|
| 1,975,887 | White | Oct. 9, 1934 |
| 2,351,114 | Freeman | June 13, 1944 |
| 3,096,856 | Burnett | July 9, 1963 |